United States Patent [19]

Hordyk et al.

[11] Patent Number: 4,896,763

[45] Date of Patent: Jan. 30, 1990

[54] TRANSPORT SYSTEM

[75] Inventors: Jan Hordyk, Beamsville; Karel A. Grande, Hamilton; Douglas M. Pickard, St. Catherines, all of Canada

[73] Assignee: RMT Engineering Ltd., Ontario, Canada

[21] Appl. No.: 314,317

[22] Filed: Feb. 22, 1989

Related U.S. Application Data

[63] Continuation-in-part of Ser. No. 198,334, May 25, 1988, abandoned.

[51] Int. Cl.⁴ ............................................. B65G 17/00
[52] U.S. Cl. ............................... 198/803.2; 198/465.3
[58] Field of Search ............. 198/803.01, 803.2, 465.1, 198/465.3

[56] References Cited

U.S. PATENT DOCUMENTS

| 25,886 | 10/1859 | Cumming . |
| 2,548,131 | 4/1951 | Stern . |
| 2,777,566 | 1/1957 | King . |
| 3,043,237 | 7/1962 | McKee . |
| 3,319,765 | 5/1967 | Hasenwinkle . |
| 3,338,382 | 8/1967 | Fogg . |
| 3,476,231 | 11/1969 | Bower . |
| 3,545,933 | 12/1970 | Podschadly et al. . |
| 3,858,707 | 1/1975 | Block et al. . |
| 3,93˙701 | 1/1976 | Mooney . |
| 3,94 359 | 4/1976 | Nussbaumer . |
| 4,088,220 | 5/1978 | Jacksch ........................ 198/803.2 |
| 4,598,818 | 7/1986 | Miller .......................... 198/803.2 |
| 4,681,212 | 7/1987 | Miller .......................... 198/803.2 |

Primary Examiner—Robert J. Spar
Assistant Examiner—Lyle Kimms
Attorney, Agent, or Firm—Ostrolenk, Faber, Gerb & Soffen

[57] ABSTRACT

A carrier unit for a transport system of the type having a flexible drive member defining a path and guide to guide the drive member around a curve in the path. The carrier unit comprises first and second engagement members for engaging respective faces of the drive member; the first and second engagement members being maintained at a fixed distance to define a passage therebetween. The second engagement member has a peripheral portion defining at least one projection, while the passage is of predetermined dimensions to permit the carrier to conform to the curve where the said second engagement member forms an arc of the curve and the projection engages with the drive member to secure the carrier thereto. A transport system utilizing the carrier is also disclosed.

3 Claims, 11 Drawing Sheets

TRANSPORT SYSTEM

This is a continuation-in-part of application Ser. No. 07/198,334, filed on May 25, 1988, now abandoned.

The present invention relates to transport systems of the type having a flexible drive member on which a number of article carriers are slidably mounted.

In conventional transport systems of this type an example of which is an accumulating conveyor, the drive member is continuous and guided by a number of sprockets. The flexible drive member operates in a cycle o displace the carriers along a work path and thereafter to return the carriers to the beginning of the path to repeat the cycle. The sliding mount of the carriers on the drive member permits the carriers to be interrupted while the motion of drive member is maintained. This allows the carriers to be accumulated and subsequently released at specific intervals. A friction coupling in the sliding mount of the carriers enables the drive member to impart motion to a carrier with a relatively heavy object with a minimum of slip between the carrier and the drive member, while allowing interruption of the motion of the carrier.

In order to make such transport systems effective, it is preferable that the carriers be locked into engagement with the drive member through the sprocket sections to ensure passage through the sprocket sections. This has posed considerable difficulty in the past as attempts have been made with complicated spring and latch mechanisms and the like, which have proved expensive to maintain.

It is therefore an object of the present invention to provide a novel transport system.

Briefly described, the invention comprises a carrier unit for a transport system of the type having a flexible drive member defining a path and guide means to guide the drive member around a curve in the path; the carrier unit comprising first and second engagement means for engaging respective faces of the drive member; the first and second engagement means being maintained at a fixed distance to define a passage therebetween; the second engagement means having a peripheral portion defining at least one projection; the passage being of predetermined dimensions to permit the carrier to conform to the curve with said second engagement means forming an arc of said curve and said projection engaged with said drive member to secure the carrier thereto.

In another aspect of the present invention, there is provided a transport system comprising a flexible drive member defining a path and guide means to guide the drive member around a curve in the path; at least one carrier unit slidably mounted on the drive member and having first and second engagement means for engaging respective faces of the drive member; the first and second engagement means being maintained at a fixed distance to define a passage therebetween; the second engagement means having a peripheral portion defining at least one projection; the passage being of predetermined dimensions to permit the carrier to conform to the curve with said second engagement means forming an arc of said curve and said projection engaged with said drive member to secure the carrier thereto.

It can thus be seen that the present invention provides a simple and effective technique of locking a slidable mounted carrier onto a drive member.

A preferred embodiment of the present invention will be described by way of example only, as seen in the appended drawings in which.

Figure 1:
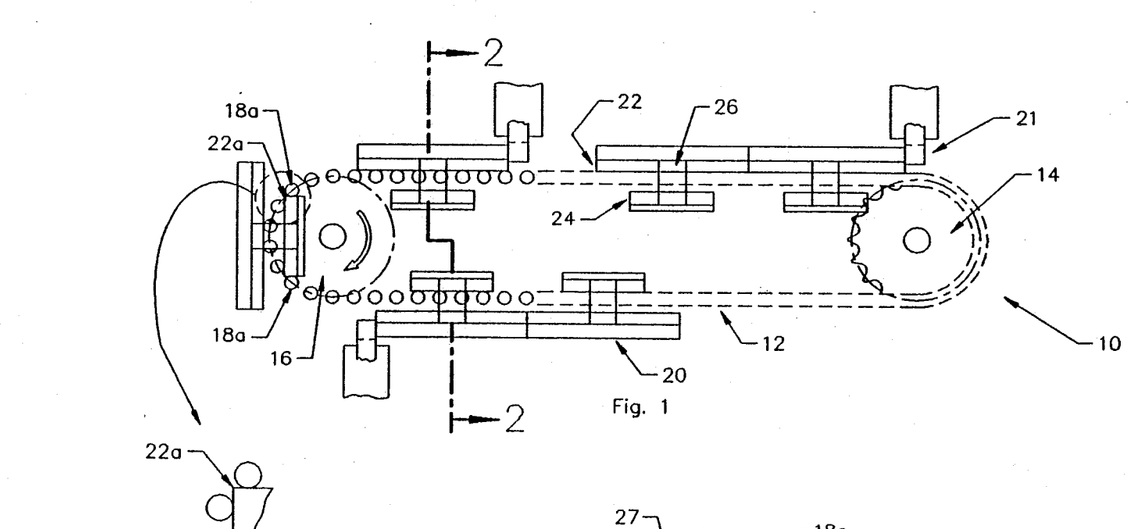
FIG. 1 is a schematic view of a transport system.
Figure 2:
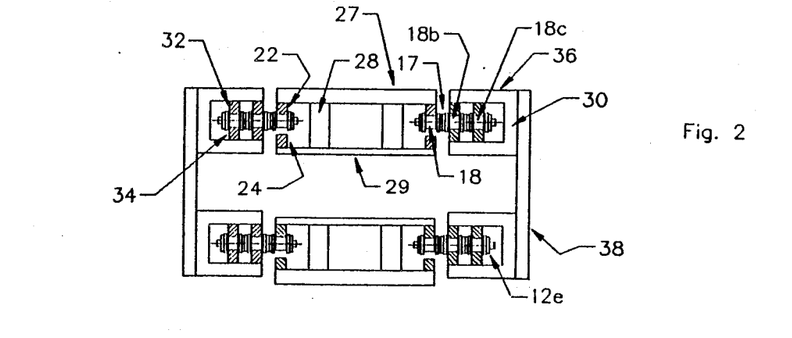
FIG. 2 is a sectional view taken on line 2—2 of FIG. 1.

Referring to FIGS. 1 and 2, there is illustrated a transport system 10 having a flexible drive member in the form of a pair of chains 12 mounted on a pair of sprocket members 14 and 16. The chains 12 each have a number of webs 17 (or 'link plates' as they are referred to in the art) and rollers 18. The chains 12 are of the 'triple strand roller chain' type as characterized by the three rollers across a transverse section of the chain. Mounted on the chain 12 are a number of carriers 20 which are slidably mounted on the chains 12. A number of interruption stations 21 ( or as commonly referred to in the art as 'escapements') are also provided to interrupt the movement of carriers between the sprockets 14 and 16 as shall be described.

Each of the carriers 20 has a pair of first sliding elements 22 and a pair of second sliding elements 24. Each of the firs sliding elements 22 is aligned with a respective second sliding element 24 to contact the inner roller 18a as viewed in FIG. 2.

The first and second sliding elements are also maintained a fixed distance by a spacing frame 26. The spacing frame 26 includes a base member 27 and a pair of flanges 28 extending outwardly therefrom and connected to a frame member 29, to which the second sliding elements 24 are mounted.

As can be seen in FIG. 2, a support structure 30 is provided for each of the chains 12. Each support structure 30 has two sets of chain guide elements 32, 34 to contact the upper and lower surfaces respectively of the middle roller 18b and the outer roller 18c. The sliding elements 32, 34 are mounted on a C-shaped support 36. A pair of supports 36 are provided on each side and one supporting each of the upper run 12d and the lower run 12e respectively. The guide members 36 are maintained in spaced relation by a support panel 38.

In the design of the transport system 10, the first and second sliding elements 22 and 24 have to satisfy two criteria in order to provide a lock between the carrier and the chain 12 in the regions of the sprockets 14 and 16. Firstly, the length of the second sliding element 24 is selected to allow the corner sections, identified at 22a in FIG. 1, to abut the faces of a pair of inner rollers 18a. Secondly, the first and second sliding elements are separated at a predetermined distance to accommodate the profile of the chain during engagement with the sprocket. This allows the carrier to be mounted slidably in the upper and lower runs of the chain 18 while being fixedly mounted to the chain when engaged with the sprockets 14, 16. This eliminates the need for complicated spring and latch mechanisms to be activated at the beginning of the sprocket section and released at the end of the sprocket section. Moreover, the fixed relationship between the first and second sliding elements improves the economy of both the manufacture and the operation of the system.

Figure 3:
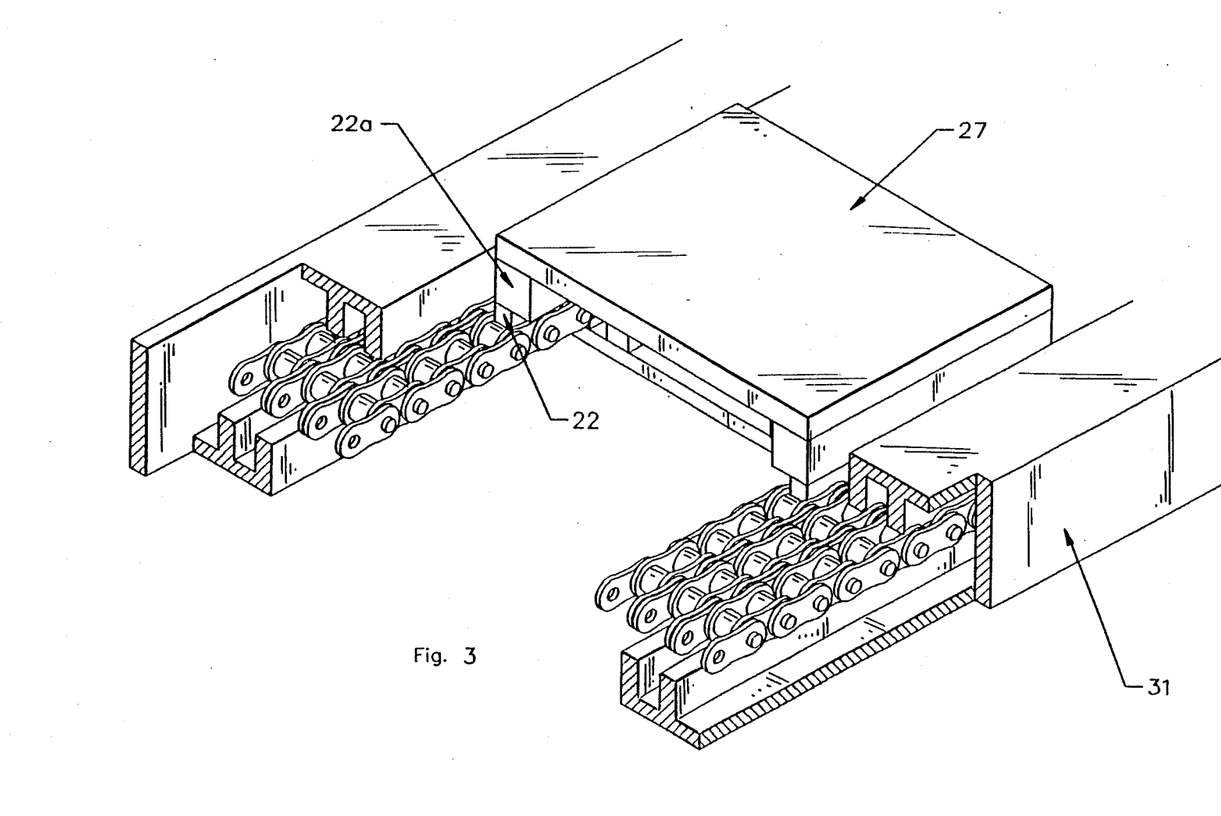
FIG. 3 is a fragmentary perspective view of a variation of the transport system illustrated in FIG. 1.

In FIG. 3 the sliding elements are mounted on an extension portion to allow the base member 27 to be spaced from the chain. As will be understood, the base member 27 also serves as the mounting point for the appropriate hardware to mount the article to be carried.

FIG. 3 also illustrates a variation of the support structure as shown at 31 wherein the support, the chain guide elements and the panel are integrally formed.

Figures 4, 5:
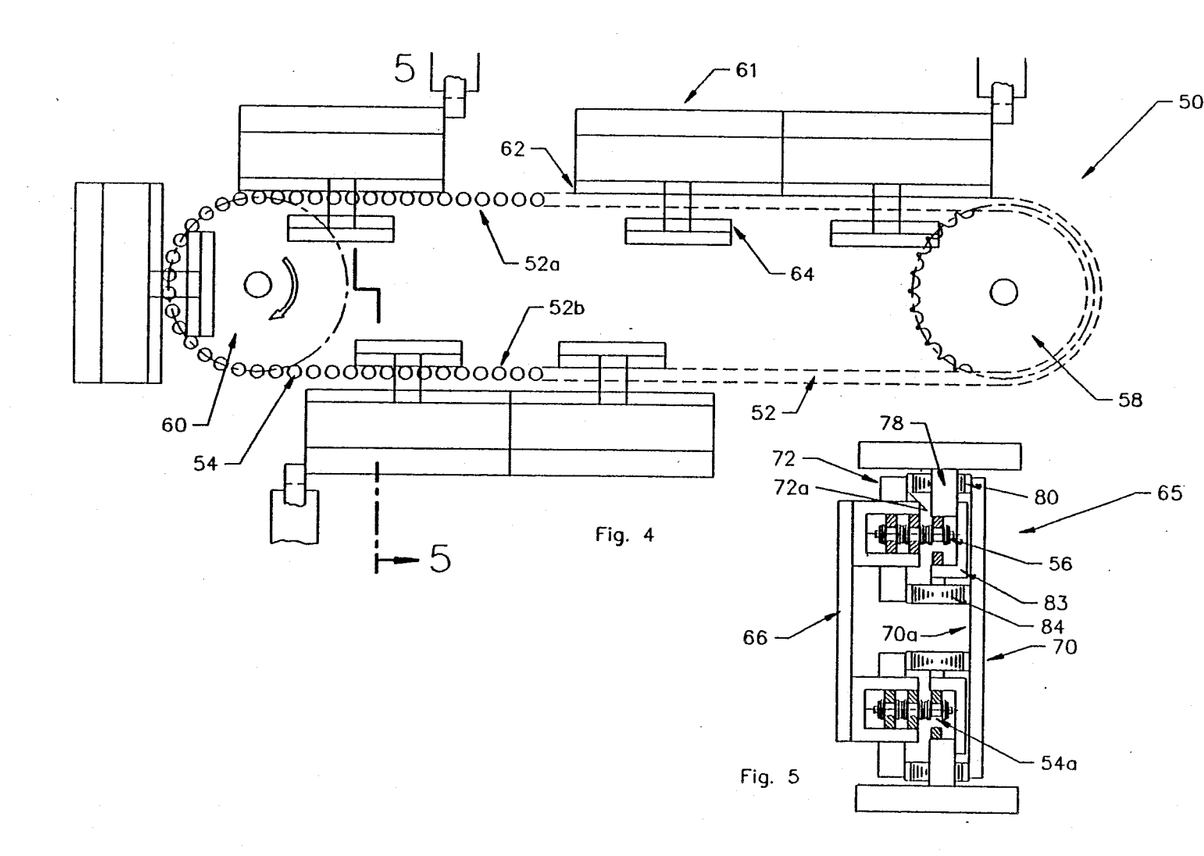
FIG. 4 is a schematic view of another transport system.
FIG. 5 is a sectional view taken on line 5—5 of FIG. 4.
Figure 6:
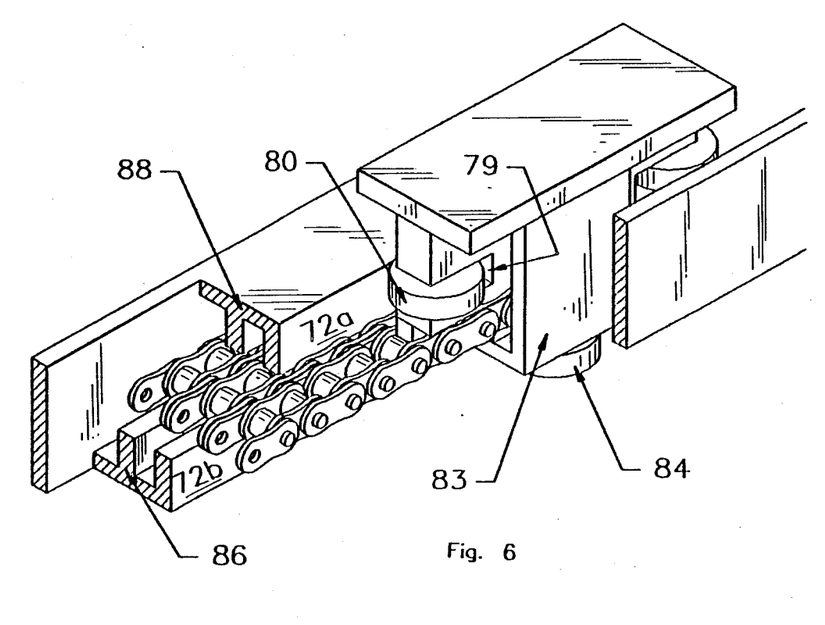
FIG. 6 is a fragmentary perspective view of a portion of the transport system illustrated in FIG. 4.

In FIGS. 4 to 6, an alternative transport system is shown at 50. In this case, a single 'triple strand roller' chain, rather than a pair of chains as in system 10, is provided at 52 having rollers 54 and link plates 56. A pair of sprockets 58 and 60 define upper and lower runs of the chain 52 as identified at 52a and 52b. A number of carriers 61 are provided with first and second sliding elements 62 and 64 respectively which engage the right hand roller 54a as viewed in FIG. 5. A support structure 66 is provided to support the chain. Due to its similarity with support structure 30, the support structure 66 will not be described further for the sake of brevity.

In view of the singular 'triple strand roller' chain in use, a guide structure 65 maintains alignment of the carrier with the chain. The guide structure 65 includes a panel 70 with an inner surface 70a which acts as a rolling surface as will be described. The guide structure also has a pair of blocks 72 mounted on upper and lower faces of each of the C-shaped supports, each of the blocks defining a rolling surface 72a.

The first sliding element 62 is mounted on an extension member 78, which has a recess 79 in which a rolling element 80 is rotatably mounted. A spacing member 83 maintains the second sliding element 64 in position and also has another rolling element 04 rotatably mounted thereon. The rolling elements thus cooperate with the rolling surfaces 70a, 72a to maintain alignment of the carrier with the chain.

A variation of the system illustrated in FIGS. 4 and 5 is shown in FIG. 6. In this case, the rolling surfaces 72a are integral with the chain guide elements 86, 88.

Figures 7, 8:
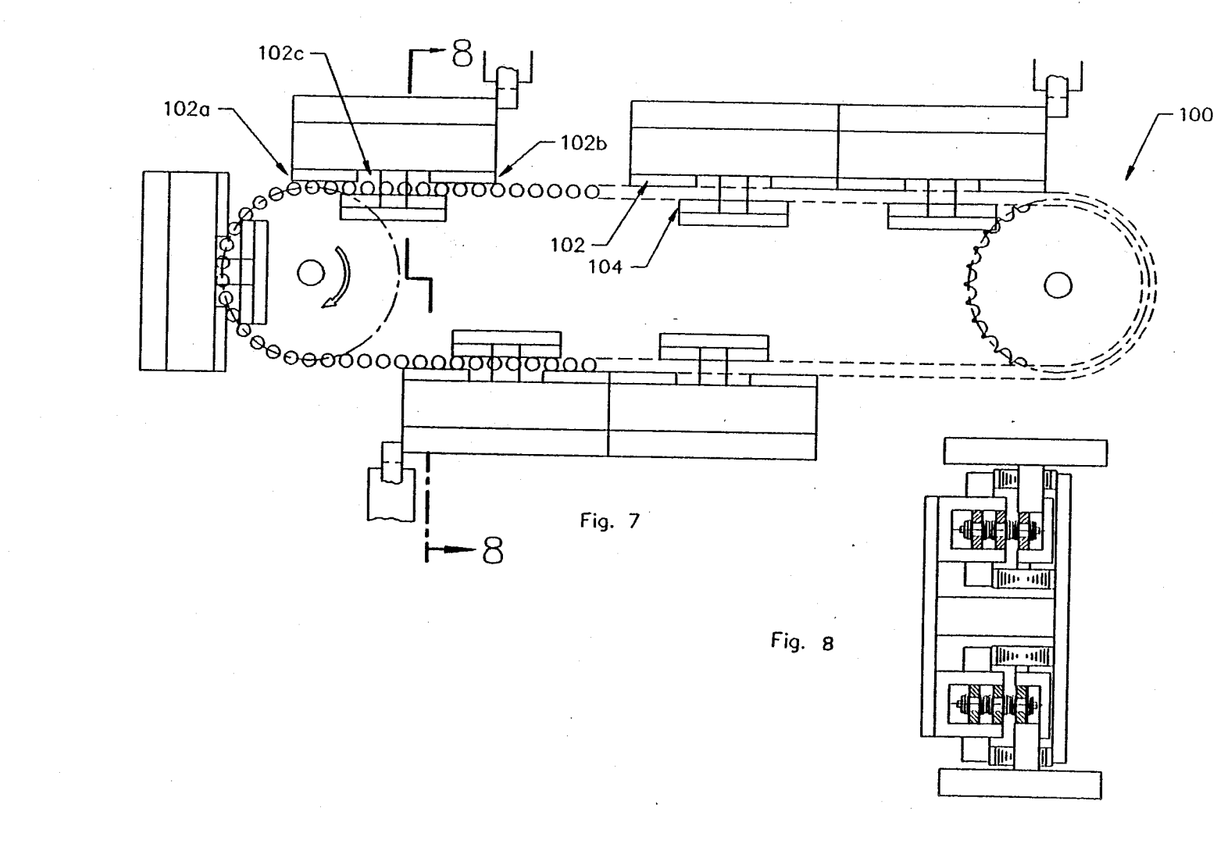
FIG. 7 is a schematic view of another transport system.
FIG. 8 is a sectional view taken on line 8—8 of FIG. 7.

A third transport system is shown at 100 in FIGS. 7 and 8. This system is similar in many respects to system 50. However, the space between the first and second sliding elements 102, 104 is reduced. In addition, the first sliding element 102 is divided into a pair of portions 102a and 102b with a passage identified at 102c defined therebetween. As will be discussed, this reduces play in the movement of the carriers along the chain while at the same time improving the lock between the chain and the carrier.

Figure 9:
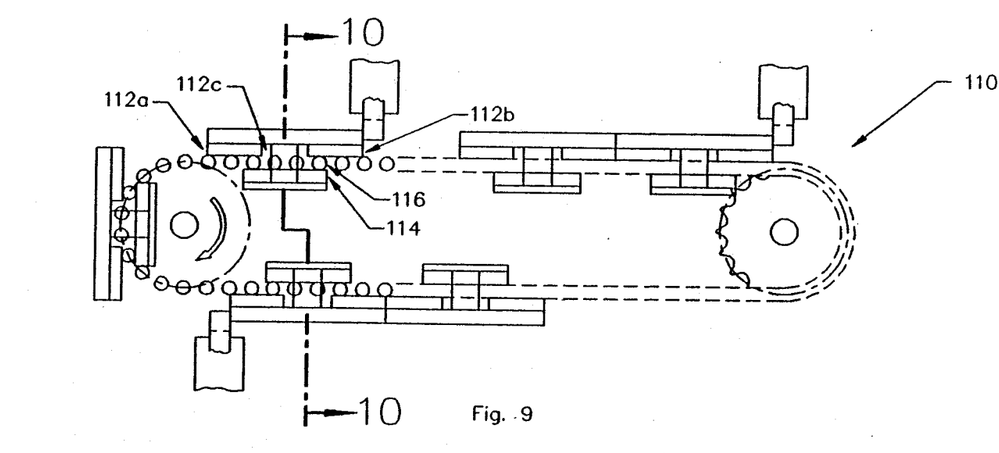
FIG. 9 is a schematic view of yet another transport system.
Figure 10:
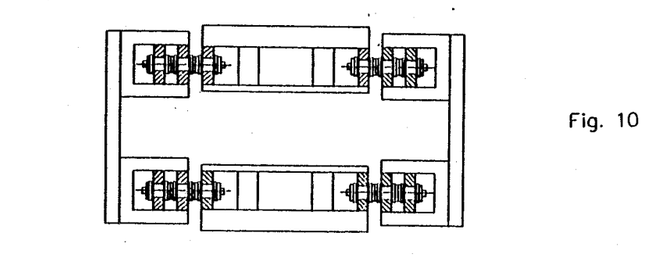
FIG. 10 is a sectional view taken on line 10—10 of FIG. 9.

Similar to system 100, a fourth transit system is shown at 110 in FIGS. 9 and 10 wherein the carriers and the chain are similar to that shown in FIG. 1 with first and second sliding elements 112, 114 forming passage 116. In this case the first sliding element 112 is divided to form portions 112a, 112b so as to form a passage 112c. As with the previous embodiment, the space between the first and second sliding elements 112, 114 is reduced.

The operation of the various systems arrangements are represented by the two sets of the schematic representations illustrated in FIGS. 11 through 20, with FIGS. 11 through 15 representing the systems 10 and 50 and FIGS. 16 through 20 illustrating carriers 100 and 110.

Figure 11:
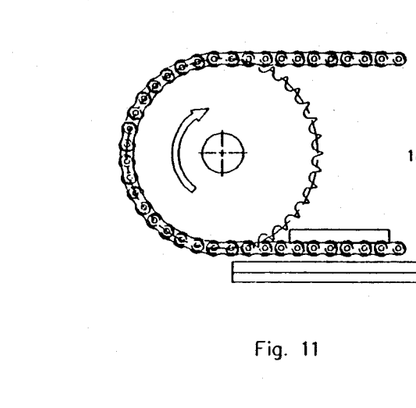
FIGS. 11 to 15 are successive schematic representations of the transport systems illustrated in FIGS. 1 and 4.
Figure 12:
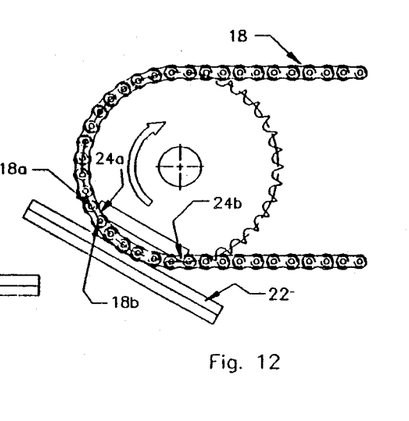
Figure 13:
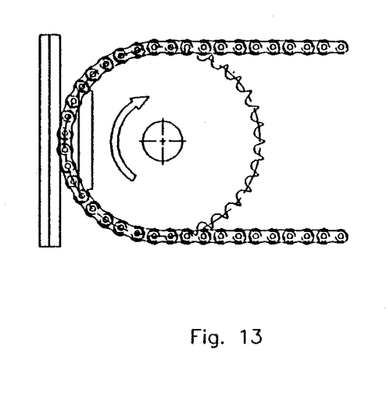
Figure 14:
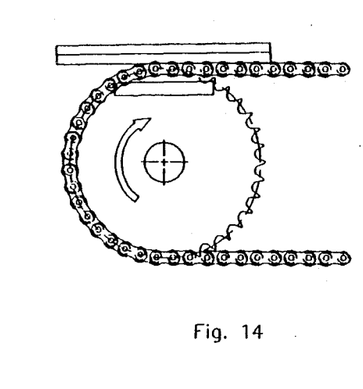
Figure 15:
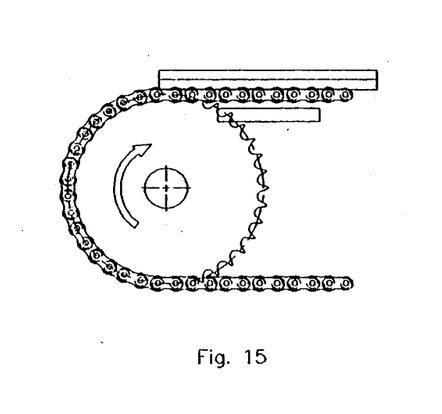

Referring to FIGS. 11 through 15, the carrier is shown in FIG. 11 approaching the sprocket. As the carrier engages that section of the chain engaging the sprocket, each of the corner portions 24a and 24b of the second sliding element 24 abut the surfaces of a pair of adjacent rollers, for example 18a and 18b shown in FIG. 12. At the same time, each of the chains abuts the surface of the first sliding element 22 so as to form a lock between the carrier and the chain. This lock is maintained while the chain is engaged with the sprocket as shown in figures 13 and 14. When the carrier leaves the sprocket section as shown in FIG. 15, sliding contact is restored between the first sliding element and the chain.

Figures 16, 17:
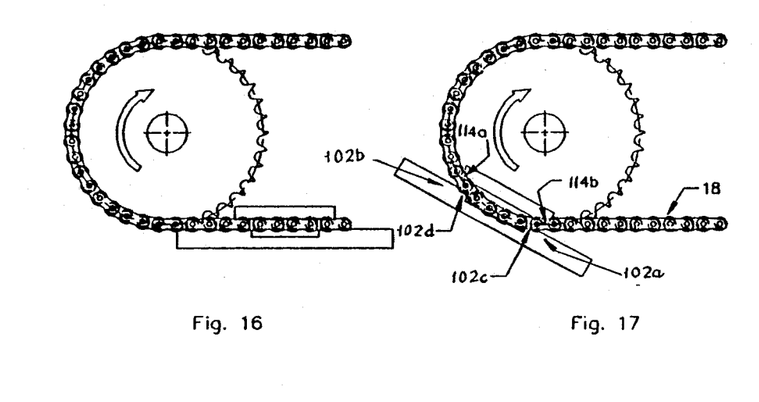
FIGS. 16 to 20 are successive schematic representations of the transport systems illustrated in FIGS. 7 and 9.
Figure 18:
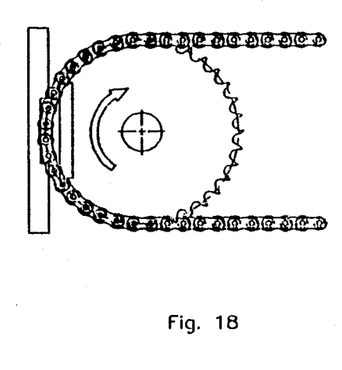
Figure 19:
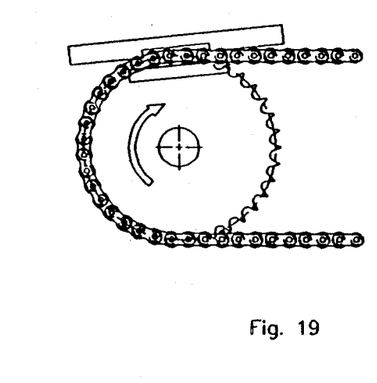
Figure 20:
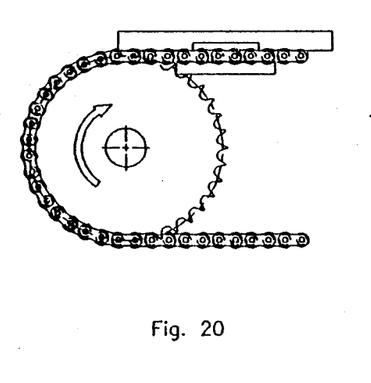

Referring now to FIGS. 16 to 20, FIG. 16 illustrates the second sliding element engaged with the chain immediately prior to the sprocket section of the chain. FIGS. 17 and 18 illustrate the locking engagement of the carrier with the chain by way of not only the corner portions 114a, 114b of the second sliding element but also the corner portions established at the inner edges 102c, 102d of the first sliding element portions 102a, 102b respectively. This provides a four point contact of the carrier with the chain which enhances the looking of the carrier with the chain.

Figure 22:
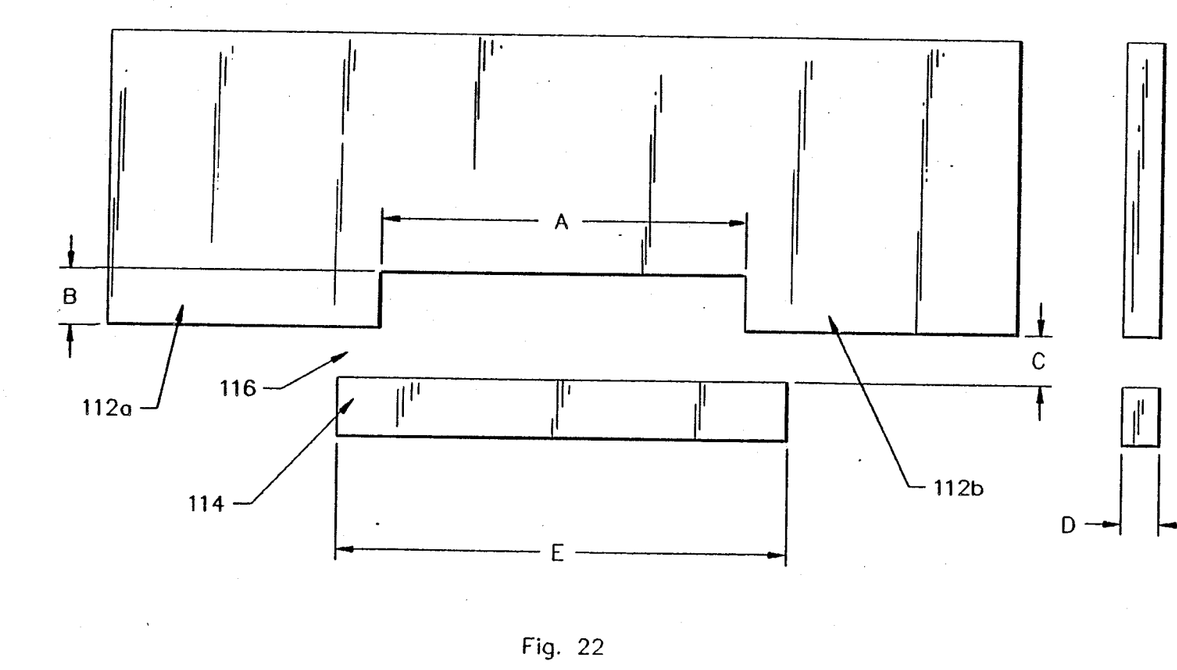
FIG. 22 is a representation of an example of the transport system illustrated in FIG. 9.

A specific example of the dimensions suitable for the system 110 is shown in FIG. 22, illustrating portions 112a and 112b as well as second sliding element 114 in side and end views. The dimensions illustrated are suitable for a carrier operating on a RC50-3 TYPE chain using 50B36 sprockets:

A = Length of passage 112c = 3.000
B = Height of portions 112a and 112b = 0.480
C = Height of passage 116 = 0.420
D = Thickness of elements 112, 114 = 0.312

(All measurements are in inches.)

Figure 23:
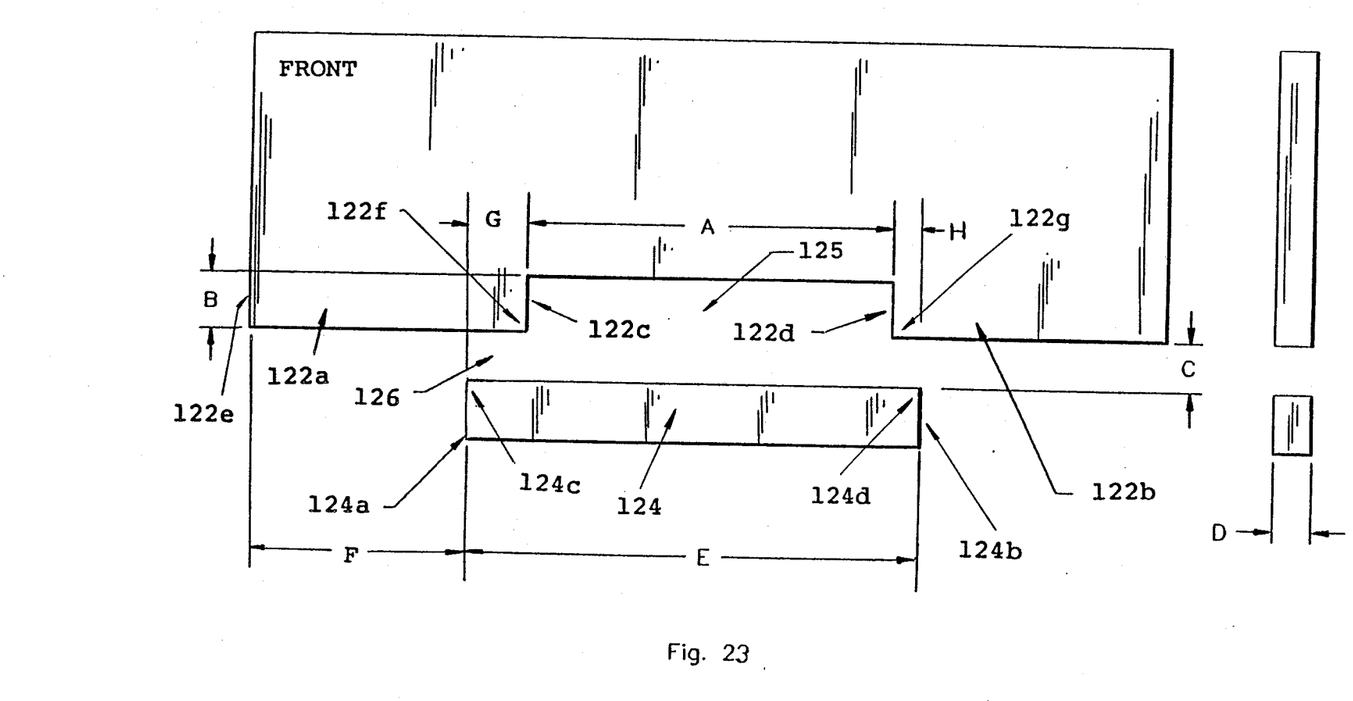
FIG. 23 is a schematic representation of an example of yet another alternative transport system.

Yet another alternative transport system can be seen at 120 in FIGS. 23 to 29. The transport system 120 has a pair of first sliding element portions 122a, 122b each having an inner face 122c, 122d respectively and an inner corner region 122f, 122g respectively which are spaced from one other to form a gap 125. The left hand first sliding element portion also has an outer face 122e. A second sliding element 124 is provided with outer faces 124a, 124b and corner regions 124c, 124d. A passage 126 is formed by the separation between the first sliding element portions 122a, 122b and the second sliding element 124. As is beat seen in FIG. 23, the second sliding element 124 is longitudinally offset relative to the gap 125. The specific dimensions in inches of the transport system 120 as identified in FIG. 23 are as follows:

A = Length of gap 125 = 3.00
B = Height of portions 122a, 122b = 0.48
C = Height of passage 126 = 0.410
D = Thickness of elements 122, 124 = 0.312
E = Length of element 124 = 3.700
F = Distance between faces 122e and 124a = 1.775
G = Distance between faces 124a and 122c = 0.475
H = Distance between faces 122d and 124b = 0.225

The offset of the second sliding element 124 relative to the first sliding element portions 122a, 122b significantly changes the function of the carrier as it traverses the sprocket section of the chain 128.

Figures 24, 25, 26:
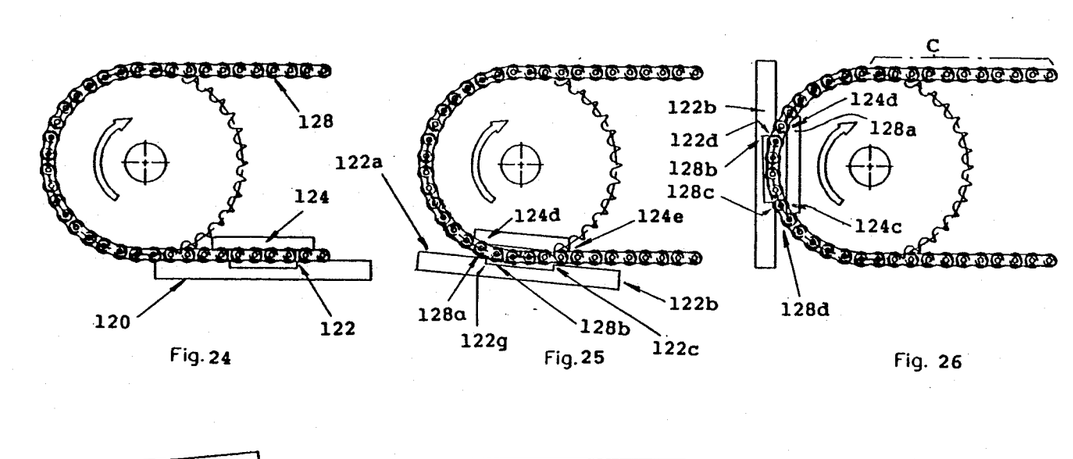
FIGS. 24 to 29 are successive schematic representations of the transport system illustrated in FIG. 23.

FIG. 25 shows a roller 128a raising corner portion 124d until corner portion 122g comes in contact with roller 128b. Roller 128b then powers the carrier through the course of the sprocket section. This is fundamentally different from the system illustrated in FIG. 17 wherein the roller engaging in corner 114b displaces the carrier through the sprocket section. In comparison with the previous transport systems described hereinabove, the offset ensures that the time at which the leading inner and outer corner portions 124d, 122g respectively engage the chain is earlier than the time at which the trailing inner and outer portion 124c, 122f respectively engage the chain. In this manner, the carrier is engaged earlier when the angle of inclination is smaller and this further reduces the possibility of the carrier sliding back before being locked in position with the chain.

FIG. 26 shows the carrier still being powered by roller 128b at corner 122d. However, in this position, three point contact between the carrier and the chain is established by:

(i) corner portion 122d and roller 128b;
(ii) corner portion 124d and roller 128a; and
(iii) corner portion 124e and roller 128c.

Figure 27:
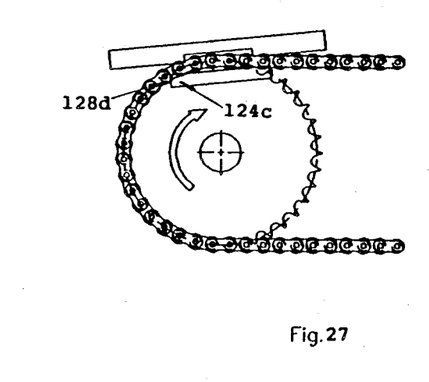
Figure 28:
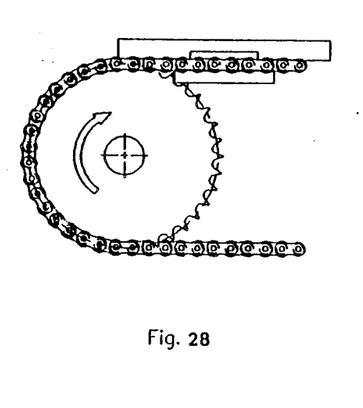

The carrier continues to be displaced upwardly from its position shown in FIG. 26 until such a time as the corner portions 124d and 122d encounter the linear section of the chain leaving the sprocket namely the region identified by "c". In this position, the roller 128a forces the first element portion 122b outwardly until contact is lost between roller 128b and corner portion 122d. This occurs when the carrier is still downwardly inclined which in turn causes an incremental rearward shift by the carrier until the roller 128d engages corner portions 124c. This roller 128d powers the carrier through the remainder of the sprocket section, as shown in FIG. 27.

Figure 29:
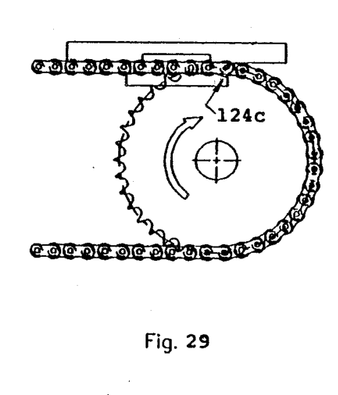

As shown in FIG. 29, a bevel 124e may be provided on the corner 124a to reduce noise, if desired.

Thus, it can be seen that the present invention provides a carrier arrangement slidably mounted on a flexible drive member in a manner that the runs of the drive member allow the carrier to be slidably mounted thereon in order that the carriers may be interrupted at any point along their travel therealong. Moreover, the present arrangement allows for a lock of the carrier with the flexible drive member in the curved portions of the system to allow a positive engagement to insure that the carrier will not slip.

Figure 21:
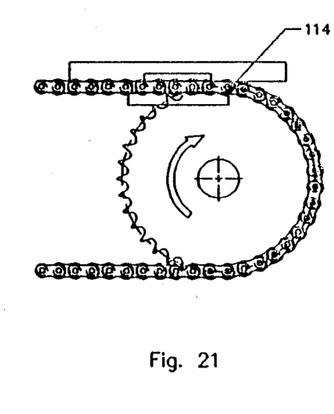
FIG. 21 is a schematic view of still another transport

If desired, the second sliding element of the carrier may be provided with a bevel at its leading edge as illustrated in FIG. 21, which is used to facilitate proper engagement of the carrier with the chain as the chain passes from the upper run to the lower run through the sprocketh.

It is to be understood that the spacing between the first and locking elements as well as the spacing between the outer edges, that is the length, of the locking element may be tailored to provide a certain degree of play when desired between the carrier and the flexible drive member.

We claim:

1. A carrier for use on an accumulating conveyor of the type having a pair of sprocket means, a continuous multiple strand roller chain with a first strand entrained on said sprocket means and a second strand supported by said first strand and laterally clear of said sprocket means, said carrier comprising an inner engagement member and an outer engagement member; means maintaining said inner and said outer engagement members at a fixed distance from one another to form a passage therebetween;

said inner engagement member having an inner planar face facing said passage to engage one side of said second strand; said inner engagement member having a pair of end faces which are substantially perpendicular to said inner planar face to form therewith a pair of inner corner portions;

said outer engagement member having a pair of incline portions with a gap therebetween, each of said portions having an outer planar face substantially parallel with said inner planar face and an end face adjacent said gap, said outer planar faces together with said end faces on said portions forming a pair of outer corner portions;

said inner and said outer engagement members and said passage being dimensioned to cause said inner and said outer corner portions to extend between the rollers of said second strand when that segment of said first strand adjacent said corner engages one of said sprocket means.

2. A carrier as defined in claim 1, wherein said passage is dimensioned to cause said inner and said outer engagement members to remain in engagement with said second strand during the course of travel of said carrier along said conveyor.

3. A carrier as defined in claim 1, wherein said inner engagement member is longitudinally offset relative to said gap.

* * * * *